(12) United States Patent
Adams et al.

(10) Patent No.: US 11,083,288 B2
(45) Date of Patent: Aug. 10, 2021

(54) SHELVING SYSTEM

(71) Applicant: The Shyft Group, Inc., Charlotte, MI (US)

(72) Inventors: Daryl Adams, Plymouth, MI (US); Eric Fisher, Plymouth, MI (US)

(73) Assignee: The Shyft Group, Inc., Charlotte, MI (US)

( * ) Notice: Subject to any disclaimer, the term of this patent is extended or adjusted under 35 U.S.C. 154(b) by 0 days.

(21) Appl. No.: 16/925,070

(22) Filed: Jul. 9, 2020

(65) Prior Publication Data

US 2021/0007478 A1 Jan. 14, 2021

Related U.S. Application Data

(60) Provisional application No. 62/872,215, filed on Jul. 9, 2019.

(51) Int. Cl.
| | |
|---|---|
| *A47B 47/00* | (2006.01) |
| *A47B 43/00* | (2006.01) |
| *A47F 5/10* | (2006.01) |
| *B60R 5/00* | (2006.01) |
| *B60P 7/00* | (2006.01) |
| *B60R 11/06* | (2006.01) |

(52) U.S. Cl.
CPC .......... *A47B 47/0091* (2013.01); *A47B 43/00* (2013.01); *A47B 47/0025* (2013.01); *A47F 5/10* (2013.01); *B60P 7/00* (2013.01); *B60R 5/00* (2013.01); *B60R 11/06* (2013.01)

(58) Field of Classification Search
CPC . A47B 47/0091; A47B 43/00; A47B 47/0025; A47B 47/042; A47B 2220/0083; A47F 5/116; A47F 5/105; A47F 7/145; A47F 5/114; A47F 5/10; B60P 7/00; B60R 11/06; B60R 5/00
See application file for complete search history.

(56) References Cited

U.S. PATENT DOCUMENTS

| | | | | | |
|---|---|---|---|---|---|
| 2,525,405 | A | * | 10/1950 | Feiertag | G06K 21/04 209/612 |
| 3,126,844 | A | * | 3/1964 | Burne et al. | A47F 5/116 108/179 |
| 3,139,192 | A | * | 6/1964 | Maguire | G09F 5/00 211/135 |
| 3,141,553 | A | * | 7/1964 | Hatfield | A47J 47/16 211/41.11 |

(Continued)

*Primary Examiner* — Ko H Chan
(74) *Attorney, Agent, or Firm* — Barnes & Thornburg LLP

(57) ABSTRACT

A modular shelving unit includes a base plate that is planar in an expanded configuration. A first foldable wall is connected to a first side of the base plate. A second foldable wall is connected to a second side of the base plate. The first foldable wall has a first segment and a second segment, and the second foldable wall has a third segment and a fourth segment. The second and fourth segments are rotatable about a respective hinge to define an interior surface with its respective first or third segment when in the expanded configuration. Shelves extend from the interior surfaces in the expanded configuration. In the collapsed configuration, the second and fourth segments are rotated about their respective hinges out of planar with their respective first and third segments. Other embodiments of modular shelving units are described herein.

19 Claims, 6 Drawing Sheets

(56) References Cited

U.S. PATENT DOCUMENTS

| | | | | |
|---|---|---|---|---|
| 3,759,599 | A * | 9/1973 | Swick, Jr. | A47B 43/00 312/262 |
| 3,815,571 | A * | 6/1974 | Heffelfinger | F24C 1/16 126/9 R |
| 4,579,401 | A * | 4/1986 | Mears | A47B 43/00 312/258 |
| 4,949,851 | A * | 8/1990 | Shaffer | A47F 5/116 211/149 |
| 5,366,100 | A * | 11/1994 | Maglione | A47F 5/116 211/150 |
| 5,465,851 | A * | 11/1995 | Smith | A47F 5/0807 108/162 |
| 5,664,854 | A * | 9/1997 | Letch | A47B 43/00 312/114 |
| 6,663,203 | B1 * | 12/2003 | Miller, Jr. | A47B 21/00 312/258 |
| 6,722,750 | B2 * | 4/2004 | Chan | A47B 43/00 312/257.1 |
| 7,451,709 | B2 * | 11/2008 | Swartfager | F25D 23/12 108/14 |
| 8,607,946 | B2 * | 12/2013 | Tamarkin | A45C 5/14 190/13 R |
| 10,869,551 | B2 * | 12/2020 | Kramer | A47B 46/005 |
| 2011/0114581 | A1 * | 5/2011 | Greenspon | A47G 25/0685 211/85.3 |

* cited by examiner

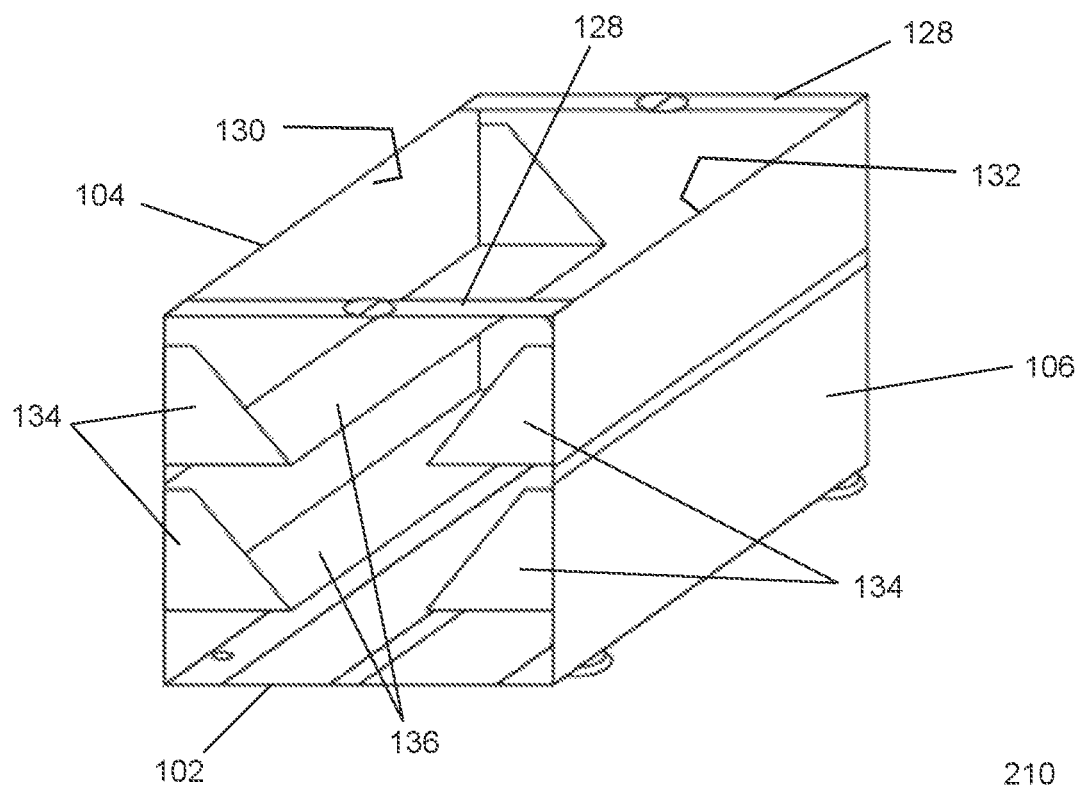
FIG. 5
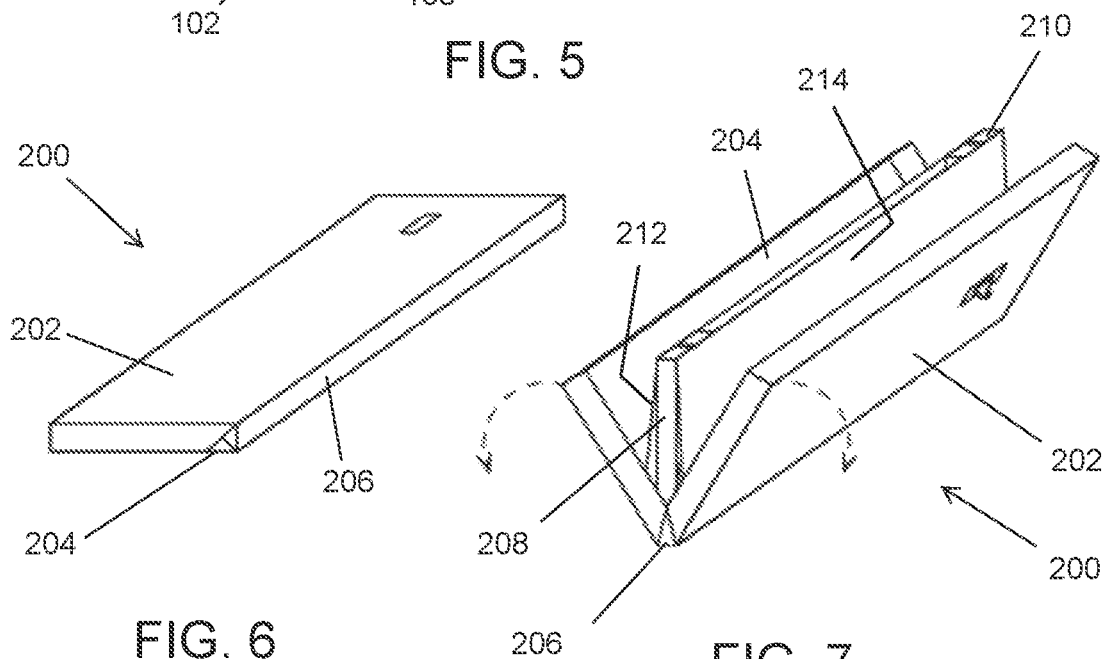
FIG. 6
FIG. 7

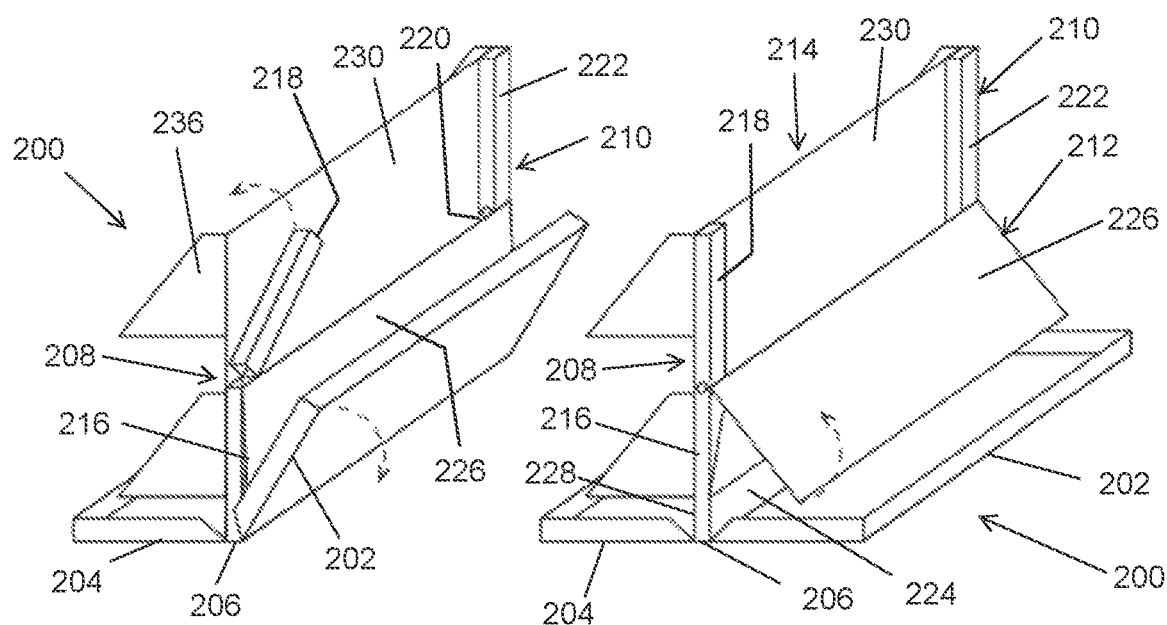
FIG. 8
FIG. 9
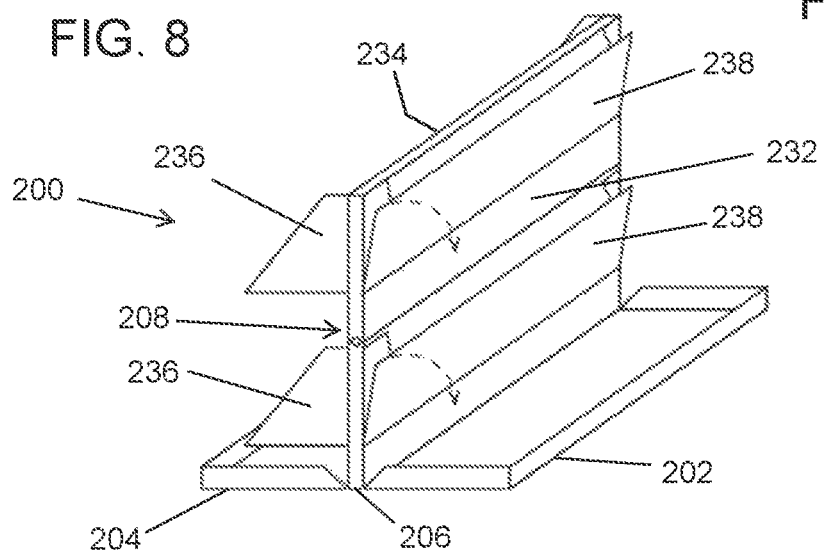
FIG. 10
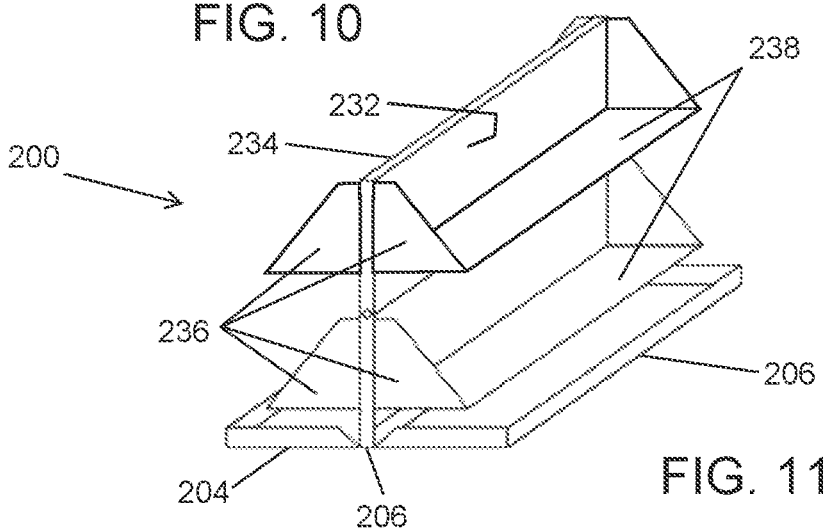
FIG. 11

SHELVING SYSTEM

CROSS-REFERENCE TO RELATED PATENT APPLICATIONS

This patent application claims the benefit of U.S. Provisional Patent Application No. 62/872,215, filed Jul. 9, 2019, the entire teachings and disclosure of which are incorporated herein by reference thereto.

FIELD OF THE INVENTION

This invention generally relates to shelving systems and more particularly to shelving systems for utility vehicles.

BACKGROUND OF THE INVENTION

Delivery vehicles come in a variety of configurations, and in some circumstances, delivery vehicles have preconfigured storage arrangements. However, the nature (e.g., size, number, weight, fragility, etc.) of the cargo or packages being delivered is constantly changing, and no one storage arrangement is perfectly suited to every combination of cargo and packages. If cargo/packages are not efficiently stored in the delivery vehicle, then they may not be conveniently accessed and efficiently delivered, increasing the time and cost associated with a delivery. Accordingly, a configurable storage arrangement designed to provide a highly customizable cargo hold of a delivery vehicle so that a variety of cargo and packages can be efficiently stowed is desirable.

The invention provides such a configurable storage arrangement. These and other advantages of the invention, as well as additional inventive features, will be apparent from the description of the invention provided herein.

BRIEF SUMMARY OF THE INVENTION

In one aspect, the invention provides a modular shelving unit are provided. In an embodiment, the modular shelving unit includes a segmented base plate that is substantially planar in an expanded configuration and is non-planar in a collapsed configuration. A first foldable wall is connected to a first longitudinal side of the segmented base plate. The first foldable wall has a first segment and a second segment, and the second segment is rotatable about a first hinge to define a substantially planar first interior surface with the first segment when in the expanded configuration. A second foldable wall is connected to a second longitudinal side of the segmented base plate. The second foldable wall has a third segment and a fourth segment, and the fourth segment is rotatable about a second hinge to define a substantially planar second interior surface with the third segment when in the expanded configuration. At least one shelf extends from at least one of the first interior surface or the second interior surface in the expanded configuration. In the collapsed configuration, the second segment is rotated about the first hinge out of planar with the first segment and the fourth segment is rotated about the second hinge out of planar with the third segment.

In embodiments, the segmented base plate includes a center segment, a first inner segment, a first outer segment, a second inner segment, and a second outer segment. In such embodiments, the first and second inner segments are hingeably connected to opposite, longitudinal sides of the center segment. Further, the first outer segment is hingeably connected to the first inner segment and to the first foldable wall, and the second outer segment is hingeably connected to the second inner segment and to the second foldable wall.

In particular embodiments, the first outer segment and the second outer segment each comprise at least one wheel. In more particular embodiments, each wheel can be configured to transition from a vertical position in the collapsed configuration to a horizontal position in the expanded configuration.

Still further, in embodiments, the modular shelving unit may also include at least one bracing arm extending between the first foldable wall and the second foldable wall such that, in the expanded configuration, the at least one bracing arm is substantially perpendicular to the first and second foldable walls and substantially parallel to the segmented base plate.

For example, in embodiments, the at least one bracing arm includes a first bracing arm extending from the first foldable wall and a second bracing arm extending from the second foldable wall, and the first bracing arm engages the second bracing arm in the expanded configuration.

In certain embodiments of the modular shelving unit, each of the at least one shelf is pivotably secured against the at least one of the first interior surface or the second interior surface. Each of the at least one shelf is configured to pivot from a first position in the collapsed configuration that is substantially parallel to the at least one of the first interior surface or the second interior surface to a second position in the expanded configuration that forms an angle of up to 90° with the at least one of the first interior surface or the second interior surface.

In another aspect, the invention provides a modular shelving unit including a first base section a second base section and a spine disposed between the first base section and the second base section. In an expanded configuration the first base section, the second base section, and the spine are substantially planar, and in a collapsed configuration, the first base section is substantially parallel to the second base section. The modular shelving unit also includes a first foldable column, a second foldable column, a first foldable wall defining a first exterior surface, and a second foldable wall defining a second exterior surface substantially parallel to the first exterior surface. The first foldable column and the second foldable column are disposed between the first foldable wall and the second foldable wall. The first foldable column, the second foldable column, the first foldable wall, and the second foldable wall all extend from the spine. At least one shelf is pivotably attached to at least one of the first exterior surface or the second exterior surface.

In embodiments, the first foldable column includes a first segment hingeably joined to a second segment, and the second foldable column includes a third segment hingeably joined to a fourth segment. In the collapsed configuration, the first foldable column and the second foldable column are configured to fold substantially in half such that the second segment is substantially parallel to the first segment and the fourth segment is substantially parallel to the third segment.

Further, in embodiments, the first foldable wall includes a first portion hingeably joined to a second portion and the second foldable wall comprises a third portion hingeably joined to a fourth portion. In the expanded configuration, the second portion is configured to be substantially planar with the first portion, and the fourth portion is configured to be substantially planar with the third portion.

In such embodiments, in the collapsed configuration, the second segment and the fourth segment may be configured to fold such that they are located between the first portion and the second portion.

Further, in embodiments of the modular shelving unit, each of the at least one shelf is configured to pivot from a first position in the collapsed configuration that is substantially parallel to the at least one of the first exterior surface or the second exterior surface to a second position in the expanded configuration that forms an angle of up to 90° with the at least one of the first exterior surface or the second exterior surface.

In embodiments of the modular shelving unit, the spine is configured to be substantially perpendicular to both the first base section and the second base section in the collapsed configuration.

In yet another aspect, the invention provides a modular shelving unit. The modular shelving unit includes a first sidewall having a first interior surface, a second sidewall having a second interior surface, and a base. The modular shelving unit also includes at least one shelf pivotably attached to at least one of the first interior surface or the second interior surface. In a collapsed configuration, the first sidewall, the second sidewall, and the base are substantially parallel to each other. In an expanded configuration, the first sidewall and the second sidewall are substantially perpendicular to the base.

In embodiments, the base further includes a first spine and a second spine. The first spine and the second spine each extend substantially perpendicular to the base. The first spine is hingeably attached to the first sidewall, and the second spine is hingeably attached to the second sidewall.

In such embodiments, the first spine and the second spine may have different heights.

Further, in such embodiments, the first interior surface comprises a first plurality of ribs and the second interior surface comprises a second plurality of ribs. In particular embodiments, in the collapsed configuration, the first plurality of ribs may be configured to contact the base and the second plurality of ribs may be configured to contact an exterior surface of the first sidewall.

In embodiments of the modular shelving unit, each of the at least one shelf is configured to pivot from a first position in the collapsed configuration that is substantially parallel to the at least one of the first exterior surface or the second exterior surface to a second position in the expanded configuration that forms an angle of up to 90° with the at least one of the first exterior surface or the second exterior surface.

Further, in particular embodiments, the modular shelving unit may further include at least one reinforcing bar extending between the first sidewall and the second sidewall.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 1-5 depict a first modular shelving unit in various stages of collapsing/expanding, according to an exemplary embodiment;

FIGS. 6-11 depict a second modular shelving unit in various stages of collapsing/expanding, according to an exemplary embodiment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Various embodiments of modular shelving units are described herein. The modular shelving units are configured to be inserted and removed as necessary from the interior cargo space of a utility vehicle in order to customize the storage space for efficient storage and retrieval of cargo or packages. The embodiments of the modular shelving units provided herein are exemplary in nature and should not be considered limiting.

Figure 1:
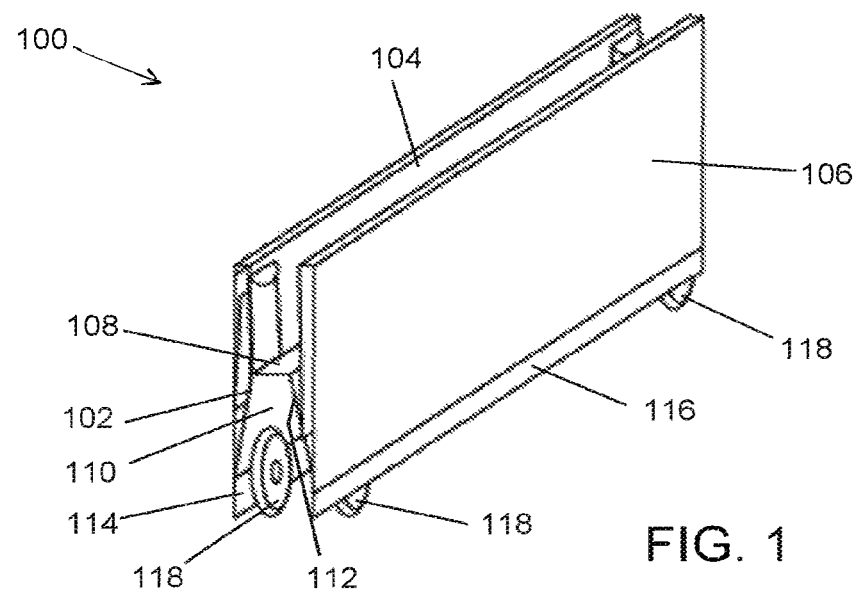
Figure 2:
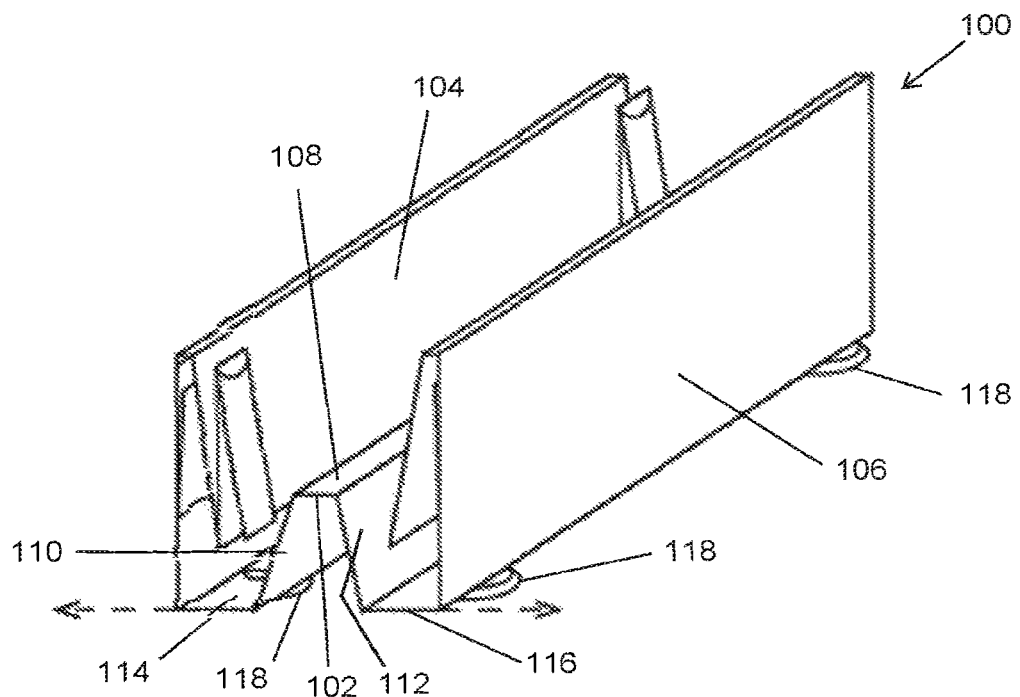
Figure 3:
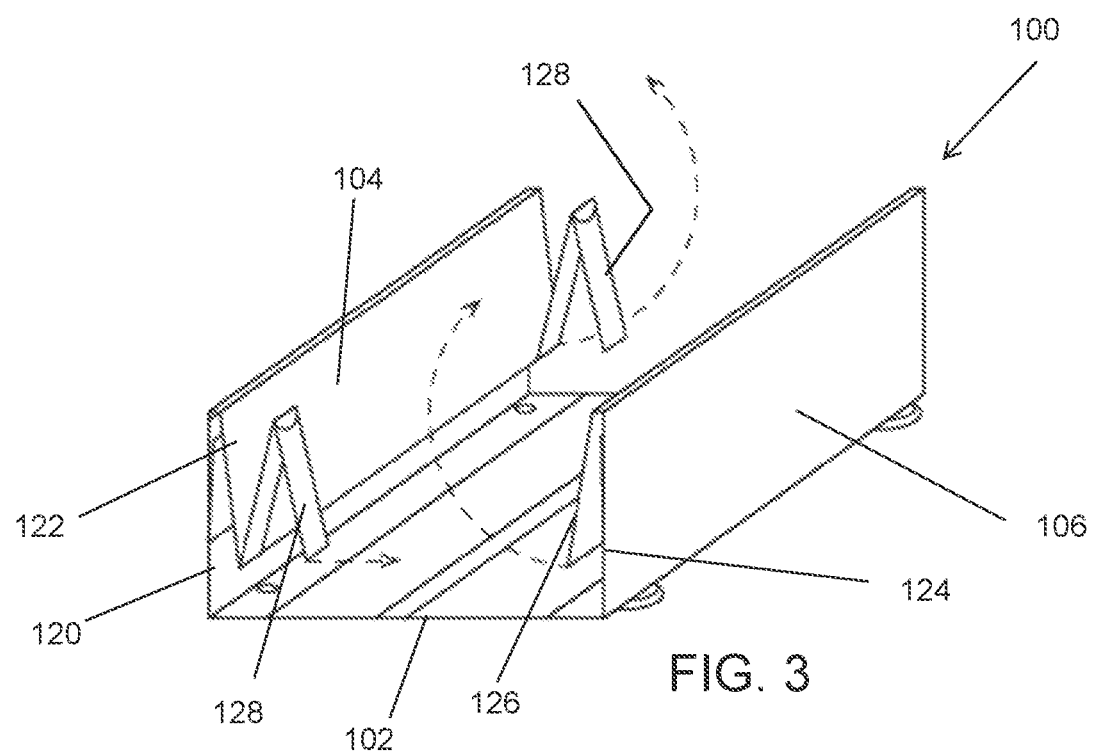
Figure 4:
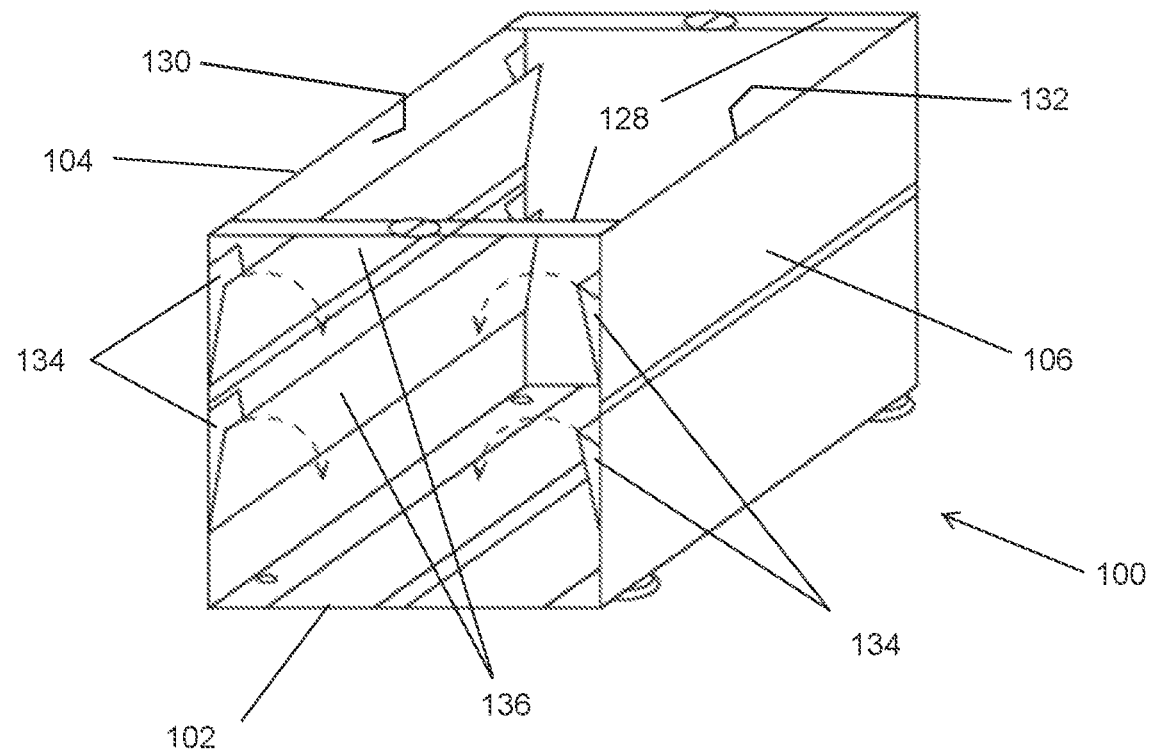

FIGS. 1-5 depict a first embodiment of a modular shelving unit 100. FIG. 1 depicts the modular shelving unit 100 in a collapsed configuration, and FIG. 5 depicts the modular shelving unit 100 in the fully expanded configuration. FIGS. 2-4 depict the steps involved in transitioning the modular shelving unit 100 between the collapsed configuration and the fully expanded configuration. While the sequence of FIGS. 1-5 depicts the expansion of the modular shelving unit 100, it should be understood that the modular shelving unit 100 could be collapsed for removal by reversing the sequence of steps depicted in FIGS. 1-5.

Referring first to FIG. 1, the modular shelving unit 100 includes a segmented base plate 102 connected on one side to a first foldable wall 104 and on an opposite side to a second foldable wall 106. In embodiments, the segmented base plate 102 includes a center segment 108 a first inner segment 110 and a second inner segment 112. The first and second inner segments 110, 112 are hingeably connected to opposite, longitudinal sides of the center segment 108. In embodiments, the segmented base 102 also includes a first outer segment 114 and a second outer segment 116. The first outer segment 114 is hingeably connected to the first inner segment 110 on one side and to the first foldable wall 104 on its other side, and the second outer segment 116 is hingeably connected to the second inner segment 112 on one side and to the second foldable wall 106 on its other side. In the embodiment depicted in FIG. 1, the first outer segment 114 and the second outer segment 116 each have a set of wheels 118. The wheels 118 facilitate transportation of the modular shelving unit 100 when the modular shelving unit 100 is in the collapsed configuration by allowing the modular shelving unit 100 to be rolled across the ground.

As shown in FIG. 2, the first foldable wall 104 and the second foldable wall 106 are moved away from each other causing the segmented base plate 102 to flatten. As shown in FIG. 2, the wheels 118 transition from a vertical position for transport (i.e., to move or roll the modular shelving unit 100 over a surface, such as the ground) to a horizontal position for sliding or locking into a track of the interior cargo space of a utility vehicle. FIG. 3 depicts the fully flattened segmented base plate 102. FIG. 3 also depicts the foldable walls 104, 106 in the process of unfolding. In particular, the first foldable wall 104 includes a first wall segment 120 hingeably attached to a second wall segment 122. The first foldable wall 104 unfolds by rotating the second wall segment 122 counter clockwise (with respect to the orientation shown in FIG. 3) relative to the first wall segment 120 until the first wall segment 120 and the second wall segment 122 form a substantially planar surface. Similarly, the second foldable wall 106 includes a third wall segment 124 and a fourth wall segment 126. The second foldable wall 106 unfolds by rotating the fourth wall segment 126 clockwise (with respect to the orientation shown in FIG. 3) relative to the third wall segment 124 until the third wall segment 124 and the fourth wall segment 126 form a substantially planar surface.

FIG. 4 depicts the first foldable wall 104 and the second foldable wall 106 in the unfolded configuration in which the first foldable wall 104 and the second foldable wall 106 are substantially perpendicular to the flattened segmented base plate 102. As can be seen in FIGS. 3 and 4, bracing arms 128 are provided at the distal ends of the first foldable wall 104. The bracing arms 128 unfold toward the center of the modular shelving unit 100 so that the bracing arms 128 of the first foldable wall 104 engage the second foldable wall 106. In their engaged configuration, the bracing arms 128 are substantially perpendicular to the foldable walls 104, 106 and substantially parallel to the segmented base plate 102.

As shown in FIG. 4, the first foldable wall 104 has a first interior surface 130, and the second foldable wall 106 has a second interior surface 132. In the collapsed configuration, shelves 134 are pivotably secured against the respective interior surfaces 130, 132 with a storage surface 136 of each shelf 134 substantially parallel to the respective interior surfaces 130, 132. In order to fully expand the modular shelving unit 100, the shelf surfaces 136 are pivoted so that they form an angle up to 90° with the interior surfaces 130, 132 (e.g., the shelf surfaces may be perpendicular to the interior surfaces 130, 132 or may form a slightly acute angle such that the storage surfaces 136 are canted slightly upward). FIG. 5 depicts the fully expanded modular shelving unit 100. In practice, not all shelves 134 may be deployed in the expanded configuration. That is, depending on the cargo being held and the needs on the remaining cargo area, no shelves 134 may be deployed or up to all the shelves 134 may be deployed. Additionally, while FIGS. 4 and 5 depict four shelves 134, the number of shelves 134 can vary, including a single shelf 134 on one of first foldable wall 104 or second foldable wall 106. Further, the first foldable wall 104 may contain a different number of shelves 134 than the second foldable wall 106.

FIGS. 6-11 depict another embodiment of a modular shelving unit 200. FIG. 6 depicts the modular shelving unit 200 in a collapsed configuration, and FIG. 11 depicts the modular shelving unit 200 in the fully expanded configuration. FIGS. 7-10 depict the steps involved in transitioning the modular shelving unit 200 between the collapsed configuration and the fully expanded configuration. While the sequence of FIGS. 6-11 depicts the expansion of the modular shelving unit 200, it should be understood that the modular shelving unit 200 could be collapsed for removal from a utility vehicle by reversing the sequence of steps depicted in FIGS. 6-11.

As shown in FIG. 6, the modular shelving unit 200 is collapsed into a relatively compact storage package as compared to the fully expanded modular shelving unit 200 shown in FIG. 11. In the embodiment depicted in FIG. 6, the modular shelving unit 200 includes a first base section 202 and a second base section 204 hingeably joined to a spine 206. As shown in FIG. 7, the base sections 202, 204 are rotated to form a substantially planar surface with the spine 206. Extending from the spine 206 are a first foldable column 208, a second foldable column 210, a first foldable wall 212, and a second foldable wall 214. The first foldable column 208 and the second foldable column 210 are disposed between the first foldable wall 212 and the second foldable wall 214.

The first foldable column 208 has a first segment 216 hingeably joined to a second segment 218, and the second foldable column 210 has a third segment 220 hingeably joined to a fourth segment 222. Further, the first foldable wall 212 has a first portion 224 hingeably joined to a second portion 226, and the second foldable wall 214 has a third portion 228 hingeably joined to a fourth portion 230. In the collapsed configuration, the first foldable column 208 and the second foldable column 210 are folded substantially in half such that the first segment 216 is parallel to the second segment 218 and the third segment 220 is parallel to the fourth segment 222. Each of the segments 216, 218, 220, 222 is contained between the first portion 224 and the third portion 228 of the foldable walls 212, 214 in the collapsed configuration. To transition to the expanded configuration, the second segment 218 and the fourth segment 222 are rotated such that the segments 218, 222 are substantially collinear with the segments 216, 220 as shown in FIGS. 8 and 9. Further, the second and fourth portions 226, 230 are rotated so that they are substantially planar with their respective first and third portions 224, 228 as shown in FIGS. 8 and 9.

In the expanded configuration, the first foldable wall 212 has a first exterior surface 232, and the second foldable wall 214 has a second exterior surface 234. In embodiments, the first exterior surface 232 is substantially parallel to the second exterior surface 234. Shelves 236 are pivotably attached to at least one of the first exterior surface 232 or the second exterior surface 234. A storage surface 238 of each shelf 236 is pivotably secured against the respective exterior surfaces 232, 234 with the storage surface 238 of each shelf 236 substantially parallel to the respective exterior surfaces 232, 234. In order to fully expand the modular shelving unit 200, the shelf surfaces 238 are pivoted so that they form an angle up to 90.degree. with the exterior surfaces 232, 234 (e.g., the shelf surfaces may be perpendicular to the interior surfaces 130, 132 or may form a slightly acute angle such that the storage surfaces 136 are canted slightly upward).

FIG. 11 depicts the fully expanded modular shelving unit 200. In practice, not all shelves 236 may be deployed in the expanded configuration. That is, depending on the cargo being held and the needs on the remaining cargo area, no shelves 236 may be deployed or up to all the shelves 236 may be deployed. Additionally, while FIGS. 10 and 11 depict four shelves 236, the number of shelves 236 can vary, including a single shelf 236 on one of first foldable wall 212 or second foldable wall 214. Further, the first foldable wall 212 may contain a different number of shelves 236 than the second foldable wall 214.

Figure 12:
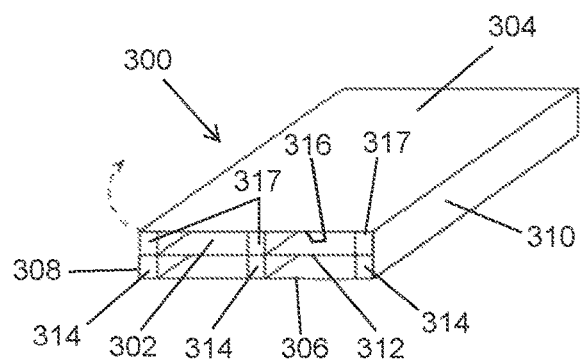
FIGS. 12-15 depict a third modular shelving unit in various stages of collapsing/expanding, according to an exemplary embodiment.
Figure 13:
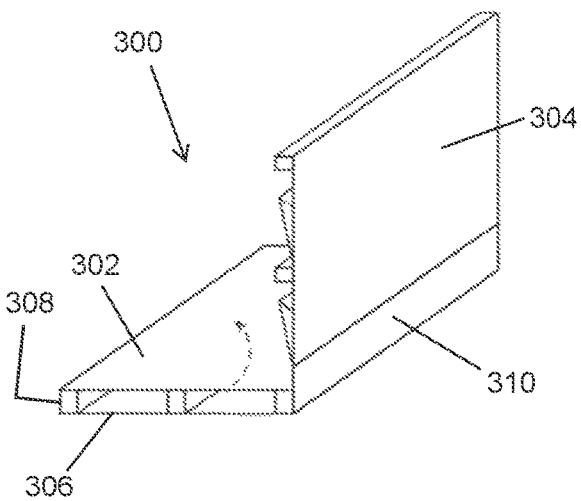
Figure 14:
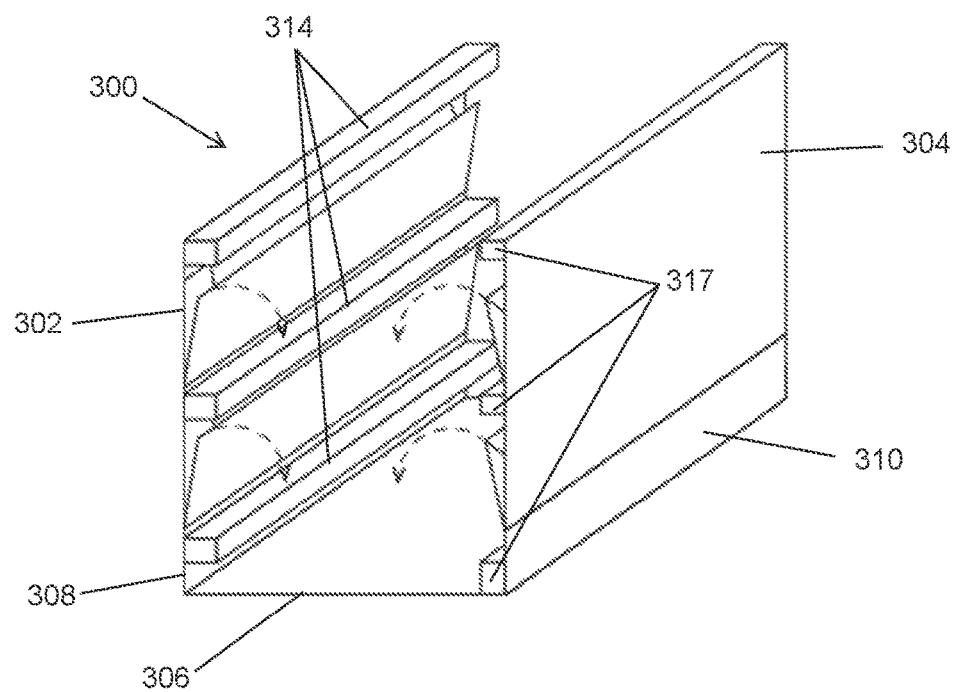
Figure 15:
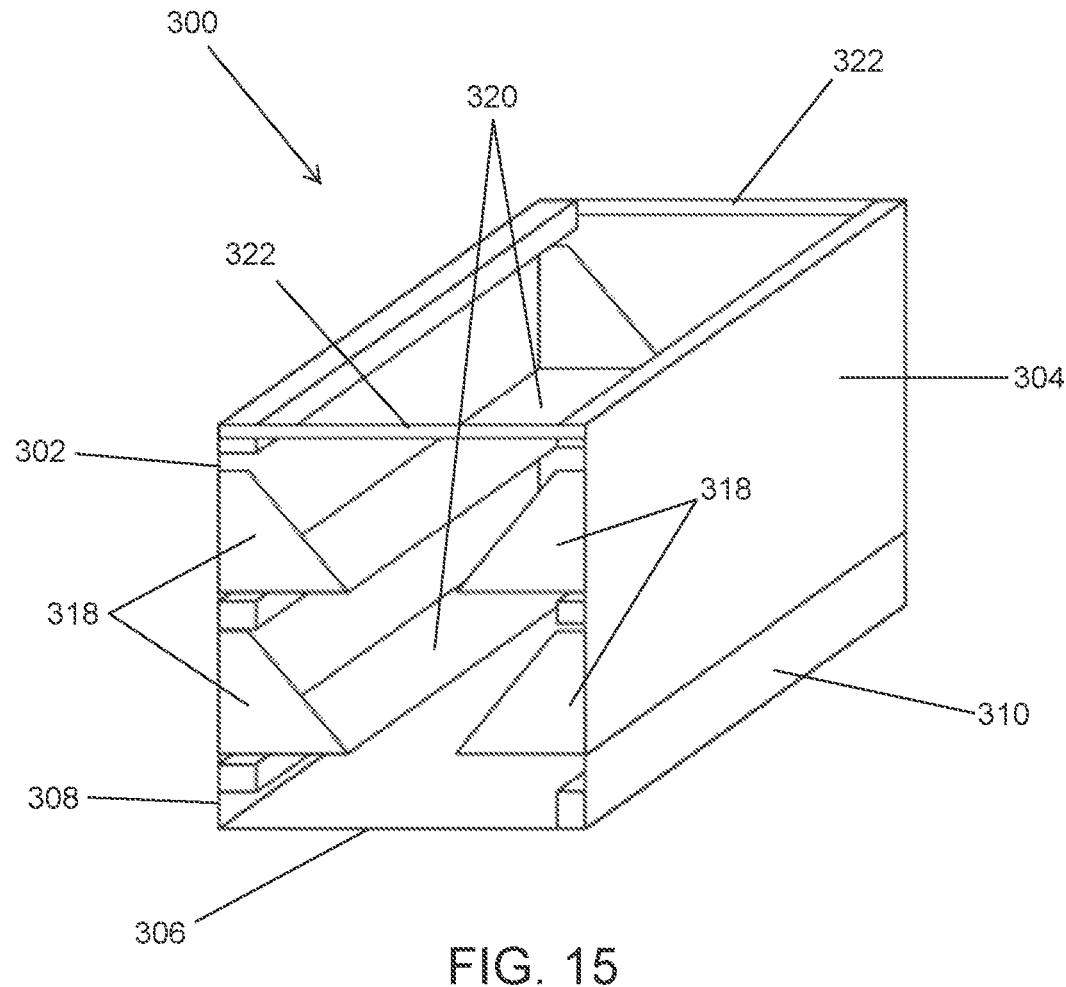

FIGS. 12-15 depict another embodiment of a modular shelving unit 300. FIG. 12 depicts the modular shelving unit 300 in a collapsed configuration, and FIG. 15 depicts the modular shelving unit 300 in the fully expanded configuration. FIGS. 12-15 depict the steps involved in transitioning the modular shelving unit 300 between the collapsed configuration and the fully expanded configuration. While the sequence of FIGS. 12-15 depicts the expansion of the modular shelving unit 300, it should be understood that the modular shelving unit 300 could be collapsed for removal from a utility vehicle by reversing the sequence of steps depicted in FIGS. 12-15.

Referring to FIG. 12, the modular shelving unit 300 includes a first sidewall 302, a second sidewall 304, and a base 306. The first sidewall 302 is connected to the base 306 via a first spine 308, and the second sidewall 304 is connected to the base 306 via a second spine 310. On a first interior surface 312 of the first sidewall 302 are a first plurality of ribs 314, and on a second interior surface 316 of the second sidewall 304 are a second plurality of ribs 317. As can be seen in FIG. 12, the first plurality of ribs 314 is in contact with the base 306 in the collapsed configuration. Further, the second plurality of ribs 317 is in contact with the first sidewall 304 in the collapsed configuration.

As shown in FIG. 13, the second sidewall 304 is hingeably attached to the second spine 310, and to expand the modular shelving unit 300, the second sidewall 304 is rotated from a position parallel to the base 306 to a position perpendicular to the base 306. Similarly, as shown in FIG. 14, the first sidewall 302 is hingeably attached to the first spine 308, and to expand the modular shelving unit 300, the first sidewall 302 is rotated from a position substantially parallel to the base 306 to a position substantially perpendicular to the base 306. As shown in FIG. 15, shelves 318 are pivotably attached to at least one of the first interior surface 312 or the second interior surface 316. A storage surface 320 of each shelf 318 is pivotably secured against the respective interior surfaces 312, 316 with the storage surface 320 of each shelf 318 substantially parallel to the respective interior surfaces 312, 316. In order to fully expand the modular shelving unit 300, the shelf surfaces 320 are pivoted so that form an angle up to 90° with the interior surfaces 312, 316 (e.g., the shelf surfaces may be perpendicular to the interior surfaces 130, 132 or may form a slightly acute angle such that the storage surfaces 136 are canted slightly upward). Further, as shown in FIG. 15, the sidewalls 302, 304 are stabilized by one or more reinforcing bars 322.

Still referring to FIG. 15, in practice, not all shelves 318 may be deployed in the expanded configuration. That is, depending on the cargo being held and the needs on the remaining cargo area, no shelves 318 may be deployed or up to all the shelves 318 may be deployed. Additionally, while FIGS. 14 and 15 depict four shelves 318, the number of shelves 318 can vary, including a single shelf 318 on one of first sidewall 302 or second sidewall 304. Further, the first sidewall 302 may contain a different number of shelves 318 than the second sidewall 306.

The embodiments of the modular shelving units 100, 200, 300 described herein are configured to be removably installed in the cargo hold of a utility vehicle (e.g., truck, van, utilivan, etc.) to efficiently stow cargo/packages for ease of retrieval. The modular shelving units 100, 200, 300 may be sized to fill the entire cargo hold of a particular utility vehicle, or the modular shelving units 100, 200, 300 may be sized so that they can be used in combination in the cargo hold of a utility vehicle. Additionally, to facilitate installation/removal, the modular shelving units 100, 200, 300 may engage a track system or an extendable platform to extend the modular shelving unit 100, 200, 300 at least partially out of the utility vehicle. Further, the modular shelving units 100, 200, 300 may be compatible with existing mounting components, E-track systems, tie-downs, etc. to secure the modular shelving units 100, 200, 300 within the utility vehicle.

Further, the embodiments of the modular shelving units 100, 200, 300 may be held in the expanded configuration using any of a variety of locking arrangements, such as clips, latches, snap or slide locks, fasteners, etc. Additionally, as used herein, the term "substantially" used in conjunction with such terms as "parallel," "perpendicular," and "planar" means within 5°, in particular within 2°, of the recited geometric relationship. For example, two components that are "substantially perpendicular" form an angle of 85°-95°, in particular 88°-92°.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A modular shelving unit, comprising:
a segmented base plate, wherein the segmented base plate is substantially planar in an expanded configuration and is non-planar in a collapsed configuration;
a first foldable wall connected to a first longitudinal side of the segmented base plate, wherein the first foldable wall has a first segment and a second segment and wherein the second segment is rotatable about a first hinge to define a substantially planar first interior surface with the first segment when in the expanded configuration;
a second foldable wall connected to a second longitudinal side of the segmented base plate, wherein the second foldable wall has a third segment and a fourth segment and wherein the fourth segment is rotatable about a second hinge to define a substantially planar second interior surface with the third segment when in the expanded configuration;

at least one shelf extending from at least one of the first interior surface or the second interior surface in the expanded configuration;

wherein, in the collapsed configuration, the second segment is rotated about the first hinge out of planar with the first segment and the fourth segment is rotated about the second hinge out of planar with the third segment.

2. The modular shelving unit of claim 1, wherein the segmented base plate comprises a center segment, a first inner segment, a first outer segment, a second inner segment, and a second outer segment;

wherein the first and second inner segments are hingeably connected to opposite, longitudinal sides of the center segment;

wherein the first outer segment is hingeably connected to the first inner segment and to the first foldable wall; and wherein the second outer segment is hingeably connected to the second inner segment and to the second foldable wall.

3. The modular shelving unit of claim 2, wherein the first outer segment and the second outer segment each comprise at least one wheel.

4. The modular shelving unit of claim 3, wherein each wheel is configured to transition from a vertical position in the collapsed configuration to a horizontal position in the expanded configuration.

5. The modular shelving unit of claim 1, further comprising at least one bracing arm extending between the first foldable wall and the second foldable wall such that, in the expanded configuration, the at least one bracing arm is substantially perpendicular to the first and second foldable walls and substantially parallel to the segmented base plate.

6. The modular shelving unit of claim 5, wherein the at least one bracing arm comprises a rust bracing arm extending from the first foldable wall and wherein the first bracing arm engages the second foldable wall in the expanded configuration.

7. The modular shelving unit of claim 1, wherein each of the at least one shelf is pivotably secured against the at least one of the first interior surface or the second interior surface and wherein each of the at least one shelf is configured to pivot from a first position in the collapsed configuration that is substantially parallel to the at least one of the first interior surface or the second interior surface to a second position in the expanded configuration that forms an angle of up to 90° with the at least one of the first interior surface or the second interior surface.

8. A modular shelving unit, comprising: a first base section;

a second base section;

a spine disposed between the first base section and the second base section, wherein, in an expanded configuration, the first base section, the second base section, and the spine are substantially planar and wherein, in a collapsed configuration, the first base section is substantially parallel to the second base section;

a first foldable column;

a second foldable column;

a first foldable wall defining a first exterior surface;

a second foldable wall defining a second exterior surface substantially parallel to the first exterior surface, wherein the first foldable column and the second foldable column are disposed between the first foldable wall and the second foldable wall and wherein the first foldable column, the second foldable column, the first foldable wall, and the second foldable wall all extend from the spine; and at least one shelf pivotably attached to at least one of the first exterior surface or the second exterior surface.

9. The modular shelving unit of claim 8, wherein the first foldable column comprises a first segment hingeably joined to a second segment, wherein the second foldable column comprises a third segment hingeably joined to a fourth segment, and wherein, in the collapsed configuration, the first foldable column and the second foldable column are configured to fold substantially in half such that the second segment is substantially parallel to the first segment and the fourth segment is substantially parallel to the third segment.

10. The modular shelving unit of claim 9, wherein the first foldable wall comprises a first portion hingeably joined to a second portion and the second foldable wall comprises a third portion hingeably joined to a fourth portion and wherein, in the expanded configuration, the second portion is configured to be substantially planar with the first portion and the fourth portion is configured to be substantially planar with the third portion.

11. The modular shelving unit of claim 10, wherein, in the collapsed configuration, the second segment and the fourth segment are configured to fold such that they are located between the first foldable column and the second foldable column.

12. The modular shelving unit of claim 8, wherein each of the at least one shelf is configured to pivot from a first position in the collapsed configuration that is substantially parallel to the at least one of the first exterior surface or the second exterior surface to a second position in the expanded configuration that forms an angle of up to 90° with the at least one of the first exterior surface or the second exterior surface.

13. The modular shelving unit of claim 8, wherein the spine is configured to be substantially perpendicular to both the first base section and the second base section in the collapsed configuration.

14. A modular shelving unit, comprising:

a first sidewall comprising a first interior surface;

a second sidewall comprising a second interior surface; a base;

at least one shelf pivotably attached to at least one of the first interior surface or the second interior surface;

wherein, in a collapsed configuration, the first sidewall, the second sidewall, and the base are substantially parallel to each other;

wherein, in an expanded configuration, the first sidewall and the second sidewall are substantially perpendicular to the base; and wherein the base further comprises a first spine and a second spine, wherein the first spine and the second spine each extend substantially perpendicular to the base, wherein the first spine is hingeably attached to the first sidewall, and wherein the second spine is hingeably attached to the second sidewall.

15. The modular shelving unit of claim 14, wherein the first spine and the second spine have different heights.

16. The modular shelving unit of claim 1, wherein the first interior surface comprises a first plurality of ribs and the second interior surface comprises a second plurality of ribs.

17. The modular shelving unit of claim 16, wherein, in the collapsed configuration, the first plurality of ribs are configured to contact the base and the second plurality of ribs are configured to contact an exterior surface of the first sidewall.

18. The modular shelving unit of claim 14, wherein each of the at least one shelf is configured to pivot from a first position in the collapsed configuration that is substantially parallel to the at least one of the first exterior surface or the second exterior surface to a second position in the expanded configuration that forms an angle of up to 90° with the at least one of the first exterior surface or the second exterior surface.

19. The modular shelving unit of claim 14, further comprise at least one reinforcing bar extending between the first sidewall and the second sidewall.

* * * * *